(No Model.)  2 Sheets—Sheet 1.
O. P. DUNLOP.
CORN PLANTER.
No. 283,330.  Patented Aug. 14, 1883.
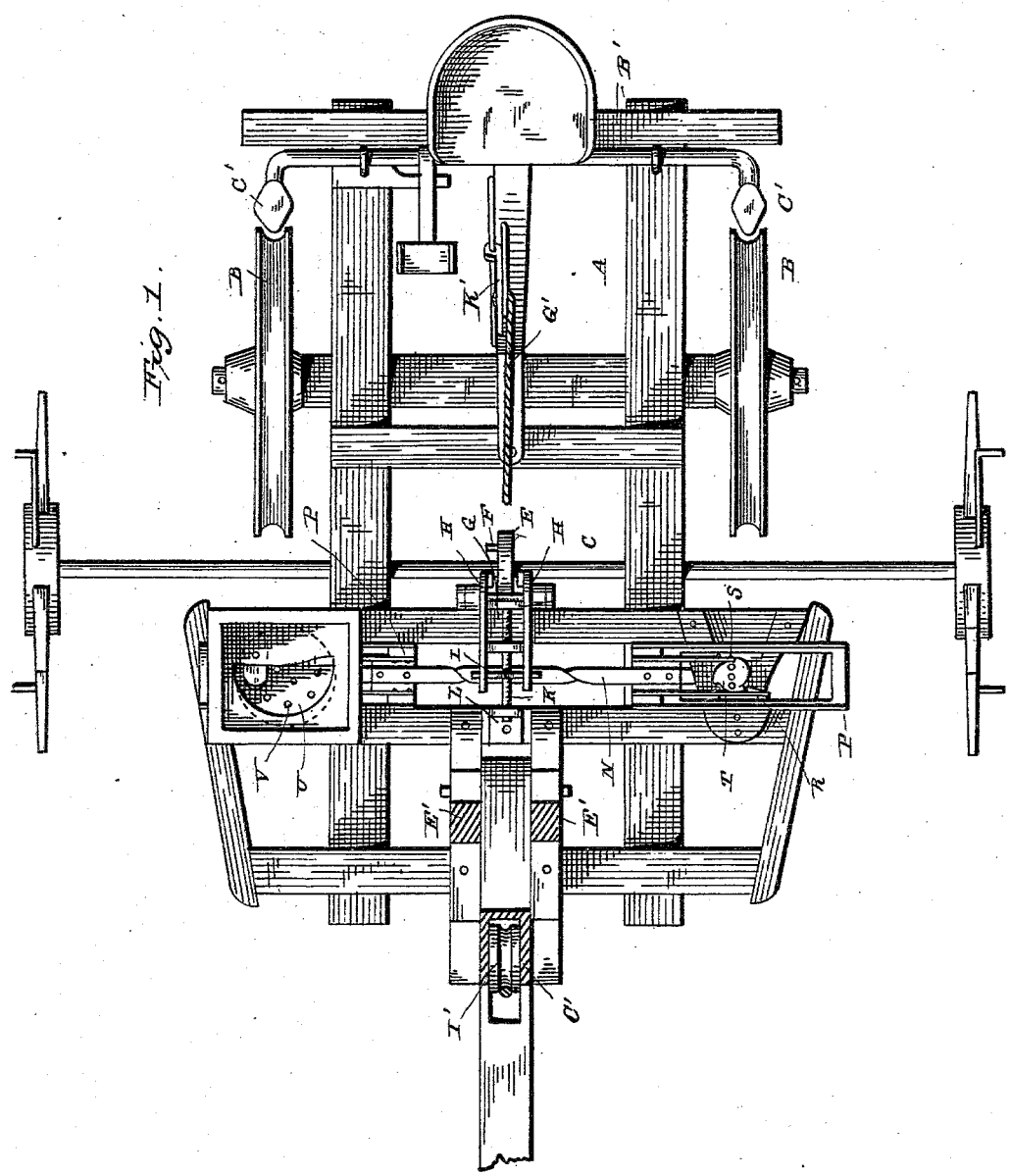
Witnesses.
Edwin L. Yewell.
J. J. McCarthy.
Inventor.
O. P. Dunlop
E. M. Alexander.
Attorney

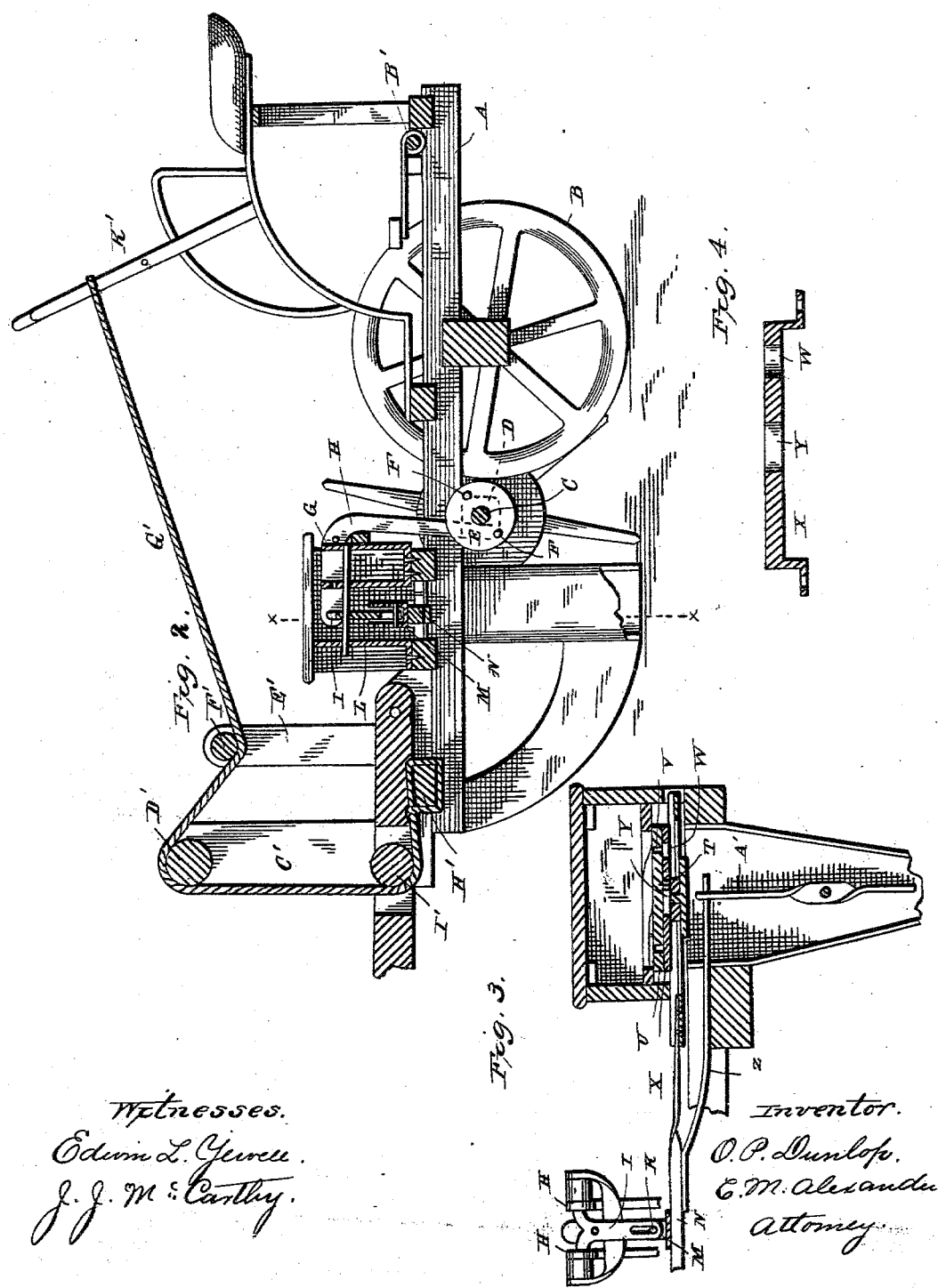

UNITED STATES PATENT OFFICE.

OLIVER P. DUNLOP, OF CANAL WINCHESTER, OHIO.

CORN-PLANTER.

SPECIFICATION forming part of Letters Patent No. 283,330, dated August 14, 1883.

Application filed April 17, 1883. (No model.)

*To all whom it may concern:*

Be it known that I, OLIVER P. DUNLOP, a citizen of the United States, residing at Canal Winchester, in the county of Franklin and State of Ohio, have invented certain new and useful Improvements in Corn-Planters, of which the following is a specification, reference being had therein to the accompanying drawings.

This invention relates to certain improvements in seed-planters; and it consists in a novel combination and arrangement of devices, as more fully hereinafter set forth, and specifically pointed out in the claim.

In the drawings, Figure 1 represents a top view of my improved apparatus with a portion removed, showing the seed-dropping devices. Fig. 2 represents a longitudinal vertical section of my improved apparatus; Fig. 3, a transverse vertical sectional view on the line $x\ x$ of Fig. 2, and Fig. 4 a detached sectional view of a plate having an aperture through which the grains or seed are dropped.

The letter A indicates the frame of the machine, which is mounted on the wheels B, which are grooved at their peripheries, as shown.

The letter C indicates a transverse shaft journaled in bearings or boxes D, secured to the lower side of the frame and projecting at each side thereof. On the projecting ends of the shaft are secured the check-row markers, which are rotated as the frame travels over the ground, rotating the shaft C. The said shaft is provided with a wheel, E, having on opposite sides the pins F, for the purpose hereinafter described.

The letter G indicates a U-shaped standard secured to the frame of the apparatus, to which are pivoted the bent levers H, the lower ends of which are alternately engaged by the pins on the wheel of the rotating shaft. The said levers, at their forward ends, are loosely connected to the lateral ends of a vibrating lever, I, which is mounted on a rock-shaft, K, journaled in bearings in the standard G, and a standard, I secured to the frame of the machine. The lower end of said lever is slotted and connected by a suitable pin to a short upright, M, connected to the lateral bars N, which connect with the slides P at each side, the said slides being reciprocated laterally by the said bars when the machine is in motion. Each slide is provided with a spring-catch, R, and a spring-detent, S, the catch being adapted to engage the ratchet-wheel T and move it one tooth at a time, while the detent holds said ratchet from moving backward. The ratchet is mounted upon a short shaft, and is located below the seed-hopper, as indicated, and is provided with two upwardly-projecting pins, which engage suitable apertures in a rotary disk, U, which is provided with a series of apertures, V, which carry the seed or grain forward, so as to drop it through an opening, W, in an intervening plate, X, which is provided with a central opening, Y, through which the ratchet-wheel passes.

The letter Z indicates a lever pivoted within the shoe A', and connected to the rod or bar of the feed device, the said lever being adapted to hold and drop the seed or grain through the shoe at suitable intervals.

The letter B' indicates a rock-shaft having arms at each end, terminating in scrapers, by means of which the grooves in the driving-wheels may be cleared of adhering soil.

The letter C' indicates a frame extending vertically from the pole-frame of the apparatus, and provided with a roller, D', at its top.

E' indicates a similar frame attached to the main frame of the apparatus, which is provided with a roller, F', setting below the roller D', before mentioned.

The letter G' indicates a rope extending from the beam H' around a roller, I', then over the roller D', then under the roller F', its extremity being attached to a lever, R', by means of which the frame may be elevated when desired.

Having thus described my invention, what I claim, and desire to secure by Letters Patent, is—

The combination, in a seed-planter, of the transverse shaft carrying the marking-wheels, the disk mounted thereon and provided with pins on opposite sides, the oscillating lever operated by said pins, the vibrating lever connected to said oscillating lever, the reciprocating slides and their catches and detents, the ratchets and rotary plates provided with apertures in stationary plate below, the levers pivoted in the shoe, and the mechanism for operating the same to drop the grain, substantially as specified.

In testimony whereof I affix my signature in presence of two witnesses.

OLIVER P. DUNLOP.

Witnesses:
   C. D. DAVIS,
   J. J. McCARTHY.